(12) United States Patent
Ramalho (10) Patent No.: US 7,284,068 B1
(45) Date of Patent: Oct. 16, 2007

(54) TECHNIQUE FOR PROVIDING MULTI-HOMING CAPABILITY IN DATA NETWORKS

(75) Inventor: Michael A. Ramalho, Wall Township, NJ (US)

(73) Assignee: Cisco Technology, Inc., San Jose, CA (US)

( * ) Notice: Subject to any disclaimer, the term of this patent is extended or adjusted under 35 U.S.C. 154(b) by 795 days.

(21) Appl. No.: 10/177,928

(22) Filed: Jun. 20, 2002

(51) Int. Cl.
*G06F 15/16* (2006.01)

(52) U.S. Cl. ............ 709/245; 709/218; 709/220; 709/222

(58) Field of Classification Search ............ 709/245
See application file for complete search history.

(56) References Cited

U.S. PATENT DOCUMENTS

| | | | |
|---|---|---|---|
| 6,721,291 B1 * | 4/2004 | Bergenwall et al. | 370/331 |
| 6,724,724 B1 * | 4/2004 | Swenson et al. | 370/231 |
| 6,829,215 B2 * | 12/2004 | Tornar | 370/223 |
| 6,947,401 B2 * | 9/2005 | El-Malki et al. | 370/331 |
| 2004/0196808 A1 * | 10/2004 | Chaskar et al. | 370/331 |

OTHER PUBLICATIONS

R.R. Stewart et al., "SCTP Extensions for Dynamic Reconfiguration of IP Addresses," Network Working Group, Jan. 29, 2002, 21 pages.
C. Perkins, "IP Mobility Support," Network Working Group, RFC 2002, Oct. 1996, 79 Pages.
R. Stewart et al., "Stream Control Transmission Protocol," Network Working Group, RFC 2960, Oct. 2000, 134 Pages.

* cited by examiner

Primary Examiner—Rupal Dharia
Assistant Examiner—Nicholas R Taylor
(74) Attorney, Agent, or Firm—Beyer Weaver LLP (57) ABSTRACT

Various aspects of the present invention are described herein for providing multi-homing capability to networks, subnetworks, and/or hosts through the use of a multiplicity of topologically correct IP addresses. For example, according to various embodiments of the present invention, extensions to Mobile IP (MIP) technology may be used as an alternative solution to the present-day problems associated with IP address multi-homing of a particular host, network, and/or subnet. According to one implementation, Specialized Home Agents may be deployed in a data network and configured to have the ability to register and manage multiple Care-of-Addresses (CoAs) for one or more multi-homed hosts (MHHs) to achieve ends similar to traditional "multi-homing" of hosts implemented via conventional routing protocols.

25 Claims, 9 Drawing Sheets

| Care-of-Address | State | Metric A | Metric B | ... | Metric Z |
|---|---|---|---|---|---|
| $IP_C$ | UP | | | | |
| $IP_{C'}$ | UP | | | | |
| ... | | | | | |

TECHNIQUE FOR PROVIDING MULTI-HOMING CAPABILITY IN DATA NETWORKS

BACKGROUND OF THE INVENTION

The present invention relates generally to data networks and more specifically to a technique for providing multi-homing capability in a data network.

The rapid growth and success of the Internet had been do largely to the fact that the Internet provides a high degree of scalability. Such scalability is due, in part, to Internet routing protocols which typically implement a technique known as "address aggregation" (also referred to as "address summarization"). An example of an address aggregation technique is illustrated in FIG. 1 of the drawings.

Figure 1:
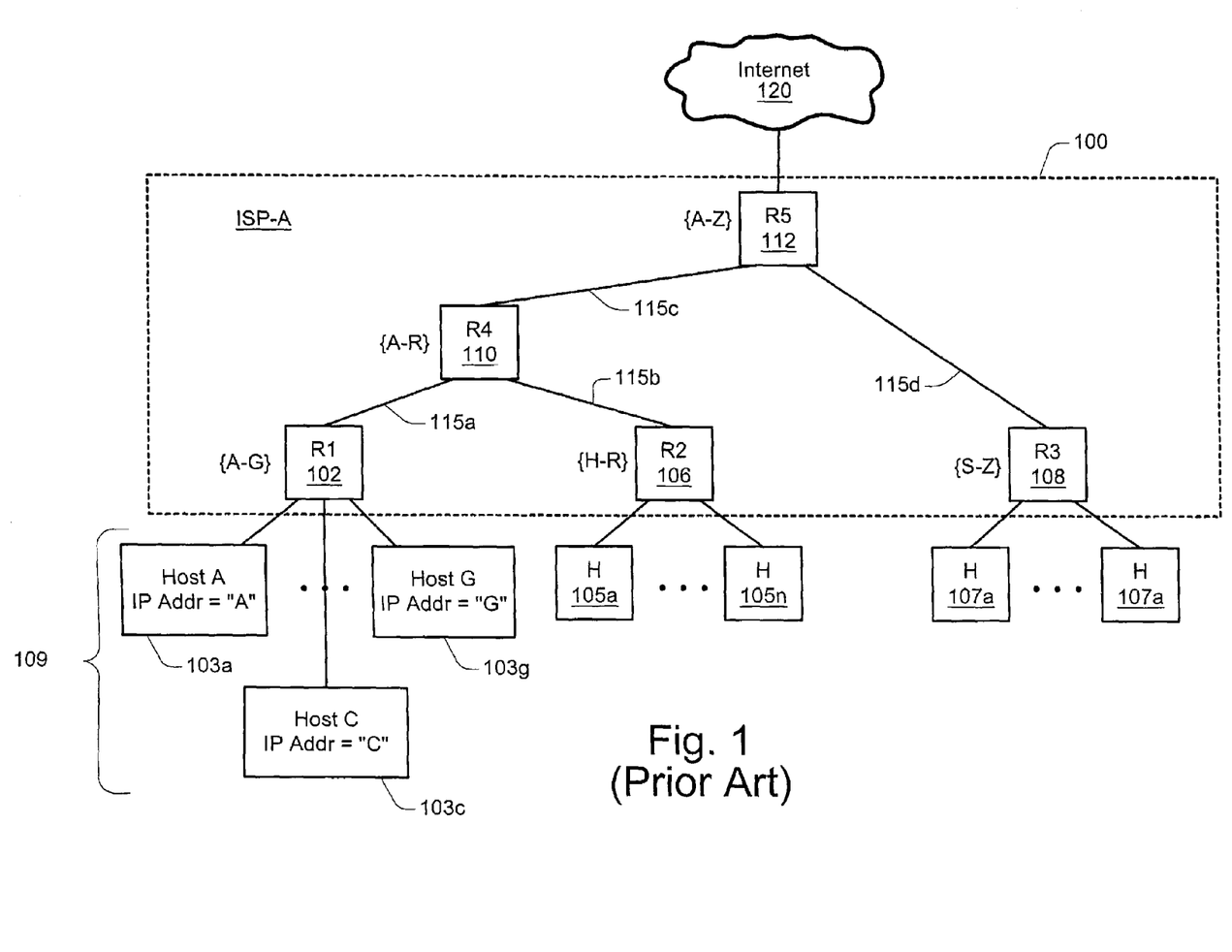
FIG. 1 illustrates a conventional address aggregation technique which may be implemented by conventional Internet routing protocols.

FIG. 1 illustrates a conventional address aggregation technique which may be implemented by conventional Internet routing protocols. As illustrated in FIG. 1, a plurality of hosts 109 may be connected to the Internet 120 via an Internet service provider (e.g., ISP-A) 100. The Internet service provider (ISP) network may include a plurality of routers (e.g., R1-R5), switches and/or other traffic handling devices which provide connectivity between hosts 109 and other portions of the Internet 120. As illustrated in the example of FIG. 1, each of the hosts are connected to the ISP via a particular router. For example, hosts 103a, 103c, 103g are connected to ISP-A via router R1 (102). According to conventional Internet protocol, each router is typically responsible for dynamically assigning a unique IP address to each of the hosts which it services. Moreover, the hosts are typically assigned "topologically correct" addresses, meaning that the network prefixes and subnet addresses assigned to each host will be consistent with the address space provisioned to a given ISP.

Further, according to conventional Internet protocol, each router is configured to advertise the address spaces which it is able to reach. For example, as illustrated in FIG. 1, it is assumed that router R1 is able to reach a plurality of addresses within the address range of {A-G}. At least a portion of these addresses correspond to IP addresses of particular hosts (e.g., Host A, Host C, Host G) which are accessible via router R1. Similarly, as shown in FIG. 1, each of the other routers advertise the address spaces which they are able to reach. For example, router R2 may advertise that it can reach addresses {H-R}, and router R3 may advertise that it can reach addresses {S-Z}.

In the example of FIG. 1, router R4 has links to both router R1 and R2, meaning that router R4 is able to reach addresses {A-G} and addresses {H-R}. Instead of advertising addresses {A-G} and {H-R} as separate address ranges, router R4 may implement an address aggregation or address summarization technique whereby the address ranges of {A-G} and {H-R} are aggregated into a single address range of {A-R}. Similarly, router R5 performs address aggregation of address ranges {A-R} and {S-Z} by advertising an address range of {A-Z}. For purposes of clarity, the technique of address aggregation or address summarization will be referred to in this application as address aggregation.

As commonly known to one having ordinary skill in the art, address aggregation may be implemented by Internet routing protocols in order to minimize advertisement information transferred between routers in the network. As a general rule, more address aggregation translates into lower routing advertisement bandwidth, and correspondingly reduces information in routing tables. Thus, when hosts are assigned "topologically correct" addresses, route aggregation may occur as a natural consequence.

It will be appreciated, however, that there exists a legitimate business need for individual computer hosts or whole computer networks to have reachability to and from the Internet through more than one Internet Service Provider. This business need usually draws upon the conjecture that individual businesses cannot count on any given Internet Service Provider to have sufficient Internet reliability and/or availability. The downside risk of loss of connectivity to/from the Internet is so high that such businesses resort to having one or more of their Internet Protocol (IP) network addresses advertised on one or more ISP networks. Connectivity of an individual host or an individual network to one or more ISP where the advertising of the identical set of IP addresses as being reachable from more than one ISPs via routing protocols is known as "IP address multi-homing", or simply as "multi-homing".

Multi-homing provides a means for increased Internet connectivity, as there are multiple points of egress to the Internet and, usually more importantly, there are multiple points of ingress to the multi-homed host/network. However, there are many shortcomings to using the present-day multi-homing technique (i.e., via routing protocols) to achieve the desired high reliability/availability ends.

Figure 2:
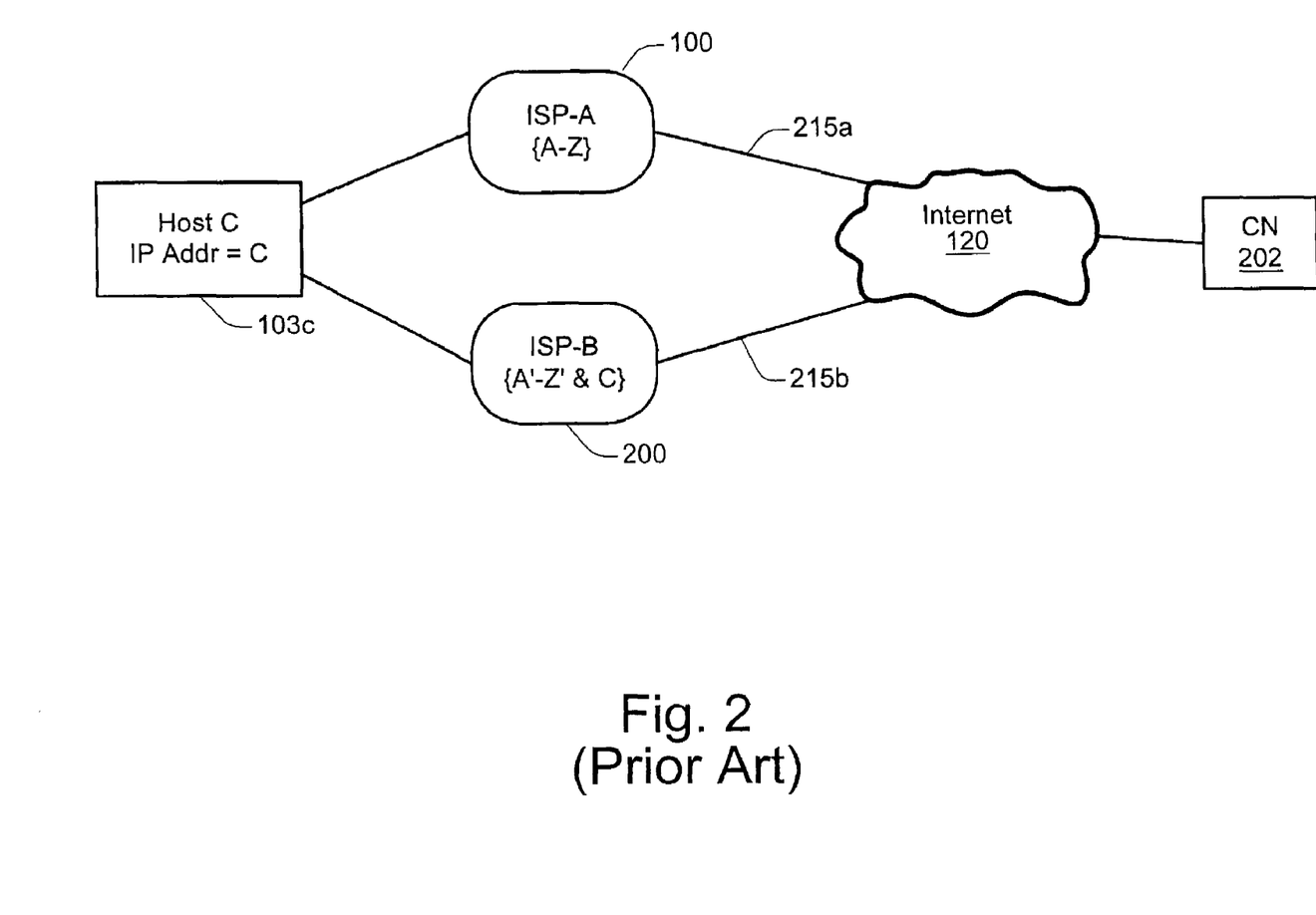
FIG. 2 shows an example of how a multi-homed host may obtain connectivity to the Internet via a plurality of ISPs using conventional Internet routing protocols.

FIG. 2 shows an example of how a multi-homed host may obtain connectivity to the Internet via a plurality of ISPs using conventional Internet routing protocols. As shown in the example of FIG. 2, connectivity to Host C 103c may be provided via a plurality of different ISPs, namely ISP-A 100, or ISP-B 200. According to conventional practice, Host C is able to achieve multi-homing capability by using a technique known as "host route injection," whereby Host C causes IP address (assigned from a first ISP) to be advertised by other ISPs which provide connectivity to Host C. Since most conventional multi-homing techniques are typically implemented via advertisement of a single network address, the address which is assigned to the Multi-homed Host (MHH) can only be topologically correct for at most one ISP. Thus, injection of the MHH host route into other ISPs will result in the other ISPs advertising foreign network addresses. For example, as illustrated in FIG. 2, IP address C is topologically correct for ISP-A 100, but is not topologically correct for ISP-B 200. However, using conventional host route injection techniques, Host C may cause ISP-B to advertise IP address C. As a result, ISP-B will advertise it's topologically correct address range {A'-Z'}, as well as the non-topologically correct address {C} associated with Host C.

It will be appreciated that hosts which advertise (or cause to be advertised) non-topologically correct addresses (also referred to as "foreign network" addresses) place a burden on routing infrastructure to advertise these "oddball" and generally non-aggregatable routes. This burden includes the bandwidth required for the advertisement, the increase in routing table size (e.g., for the "oddball" address(s) or network prefixe(s)), and additional packet processing for a given router. Moreover, the propagation of routing of address information beyond interior routing protocols yields increasing advertisement bandwidth and routing table information between ISPs (e.g., via exterior routing protocol bandwidth to advertise the MHHs).

As the demand for multi-homed hosts is expected to increase, the issues with these MHH advertisements threaten the efficacy of cross-ISP routing protocols. For example, host route injection of foreign network addresses prevents ISPs from performing effective address aggregation, and increases burdens on existing routing infrastructures (e.g., increased advertisement bandwidth requirements, increased routing table information, increased packet processing burdens, decrease in the timeliness of the advertisement updates, etc.).

Additionally, it will be appreciated that continued TCP session connectivity between a multi-homed host (e.g., 103c) and a correspondent node (e.g. CN 202) requires that the same IP address for the multi-homed host be used throughout the session. Thus, if the IP address of the multi-homed host 103c were to change in the middle of a session, the existing TCP session would be torn down, and a new TCP session would need to be established (with the correspondent node) using the new IP address of the multi-homed host. Newly designed IP transport session protocols (e.g., SCTP) may not require the continued use of the same IP address; however these protocols are not widely deployed or available on CNs, and applications are only beginning to exploit the ability to change IP address during a given session. Thus, a method that maintains a given IP address for the lifetime of the session for legacy and new TCP applications is generally preferred since such a method will typically provide a higher degree compatibility with existing protocols.

Additionally, it will be appreciated that when the reachability of a given MHH through a given ISP goes down, the MHH may be reachable through an alternate ISP path only after routing convergence makes an alternative path feasible (or attractive in the routing sense). As used in this application, the time required for achieving such routing convergence may be referred to as the "route annealing" time required to access the MHH via an alternative path. Thus, it will be appreciated that conventional multi-homing techniques significantly impact the route annealing time required for convergence of interior and/or exterior routing protocols. Moreover, increased use of MHHs via traditional routing protocol techniques threatens the viability of today's external routing protocols.

Yet another problem associated with conventional multi-homing techniques is that route selection is typically based upon policy criteria of exterior routing protocols (e.g., BGP policy criteria). Typically, such policy criteria needs to be distributed to all affected routers (typically boarder routers) in the network in order, for example, to provide for proper route selection of specific types of traffic, or to provide for proper route selection of traffic originating from specific designated sources. However, such policy criteria only serves to further exacerbate advertisement bandwidth, routing table size, and packet processing requirements.

Thus, it will be appreciated that the conventional practice of implementing multi-homing techniques via routing protocols burdens network resources and limits scalability of the network. Accordingly, it will be appreciated that there exists a continual desire to improve upon multi-homing techniques in order, for example, to overcome at least some of the problems associated with conventional multi-homing techniques.

SUMMARY OF THE INVENTION

According to different embodiments of the present invention, various methods, systems, and computer program products are described for implementing multi-homing capability in a data network. The data network includes a wide area network, a plurality of network service providers, and at least one host. The host has associated with it a foreign agent and a home agent. A plurality of network addresses associated with the host is obtained. Each of the plurality of network addresses represents a respective Care-of-Address associated with the host. At least a portion of the network addresses are registered with the home agent. According to a specific embodiment, correspondent nodes wishing to communicate with the host may send their data parcels to the home agent using the proxy address. The home agent then forwards the data parcels to the host using one or more selected IP tunnels corresponding to the Care-Of-Addresses associated with that host. In one implementation a first network address associated with the host is obtained from a first network service provider, wherein the first network address is topologically correct relative to the first network service provider. Additionally, a second network address associated with the host is obtained from a second network service provider, wherein the second network address is topologically correct relative to the second network service provider.

According to different embodiments of the present invention, various methods, systems, and computer program products are described for implementing multi-homing capability in a data network. The data network includes a wide area network, a plurality of network service providers, and at least one host. The host has associated with it a foreign agent and a home agent. According to specific embodiments of the present invention, multi-homing capability may be provided to a given host in the data network via at least a portion of the plurality of network addresses associated with that host. Additionally, implementation of the multi-homing capability may be achieved without using a host route injection technique.

Alternate embodiments of the present invention are directed to various methods, systems, and computer program products for implementing multi-homing capability in a data network. The data network includes a wide area network, a plurality of network service providers, and at least one host. The host has associated with it a foreign agent and a home agent. A plurality of network addresses associated with the host are registered at the home agent. Each of the plurality of network addresses represents a respective Care-of-Address associated with the host. A proxy address is advertised by the home agent to be used by correspondent nodes for communicating with the host. The proxy address is different than each of the plurality of network addresses associated with the home agent. When a data parcel from a correspondent node is received at the home agent, and the destination address of the data parcel is corresponds to the proxy address (associated with the host), the home agent forwards the data parcel, using a tunneling protocol, to the host using at least one of the plurality of Care-Of-Addresses associated with the host.

When the host wishes to communicate with correspondent nodes in the data network, it may generate data parcels to be sent to the correspondent nodes. According to a specific embodiment, the data parcels may include a source address which corresponds to a proxy network address associated with a home agent in the data network. Correspondent nodes wishing to communicate with the host may send their data parcels to the home agent using the proxy address. The home agent may then forward the data parcels to the host using one or more selected IP tunnels corresponding to the Care-Of-Addresses associated with that host.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

Various aspects of the present invention are described herein for providing multi-homing capability to networks, subnetworks, and/or hosts through the use of a multiplicity of topologically correct IP addresses. For example, according to various embodiments of the present invention, extensions to Mobile IP (MIP) technology may be used as an alternative solution to the present-day problems associated with IP address multi-homing of a particular host, network, and/or subnet. According to one implementation, Specialized Home Agents may be deployed in a data network and configured to have the ability to register and manage multiple Care-of-Addresses (CoAs) for one or more multi-homed hosts (MHHs) to achieve ends similar to traditional "multi-homing" of hosts implemented via conventional routing protocols.

According to specific embodiments of the present invention, Mobile IP (MIP) Home Agent and Mobile IP (MIP) Foreign Agent functionality may be adapted with one or more extensions in order to provide features which are not provided by traditional Mobile IP (MIP) Home Agents, Foreign Agents, or traditional routing protocols. One such feature relates to the use of multiple, topologically correct IP addresses (e.g., a minimum of one per ISP connection) for an individual MHH. Another feature relates to obviating the advertisement of foreign network addresses across ISPs to obtain a "multi-homed presence" for an MHH. Yet another feature relates to an explicit mechanism to steer flows to specific Care-of-Addresses (associated with an MHH) based on explicit signaling from the MHH, explicit signaling from a Specialized Foreign Agent (associated with the MHH), and/or other desired heuristics. Such features add flexibility for the management of flows to the MHH addresses, with finer granularity than that possible with conventional multi-homing techniques. An additional feature relates to the benefit of a simplified "switchover" mechanism, which enables switchover to alternative paths, for example, in response to explicit signaling from an MHH or a Specialized Foreign Agent. This latter feature may be used, for example, to help minimize the "route annealing time" for alternative MHH path(s) to become viable by not relying on routing convergence.

Figure 3:
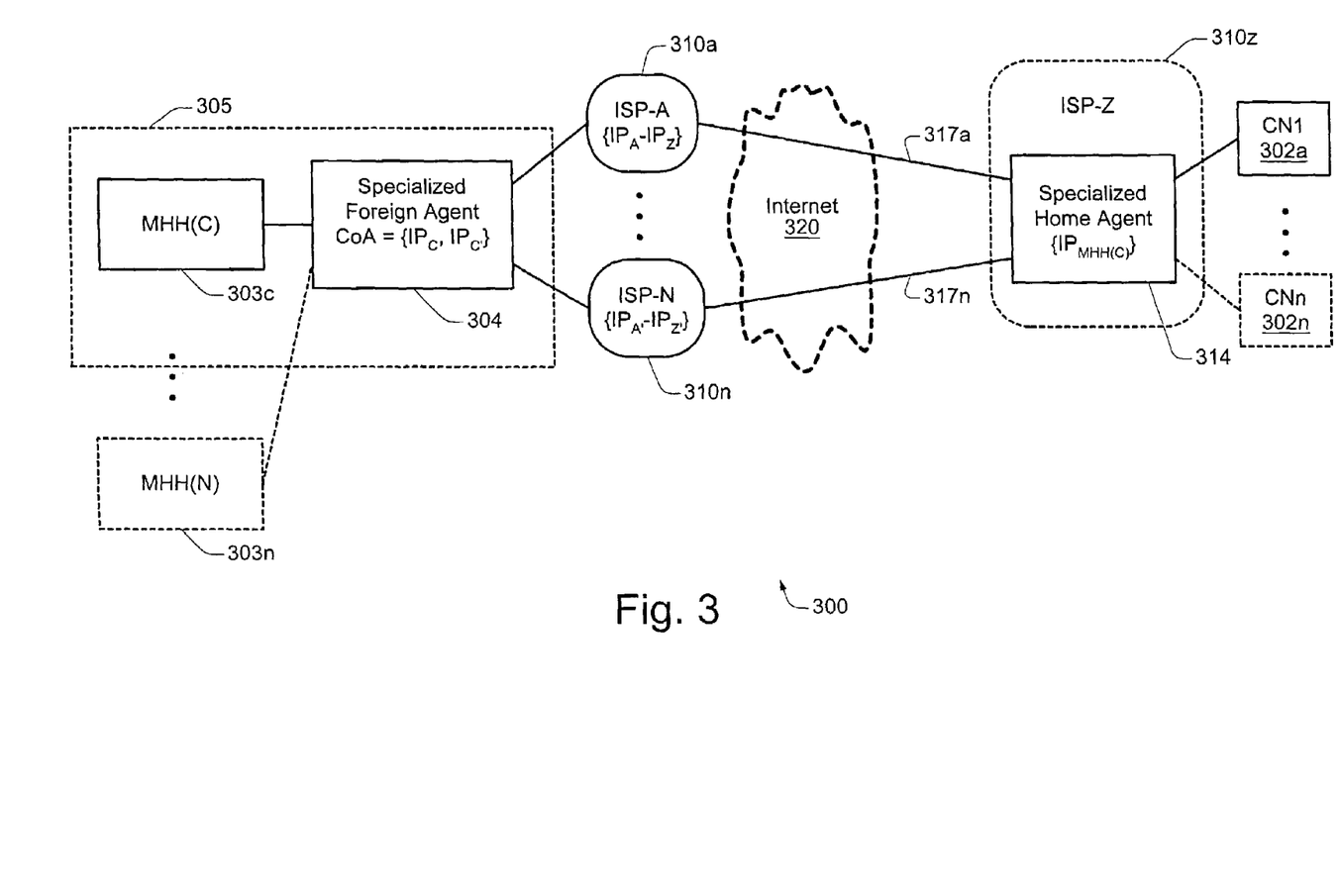
FIG. 3 shows a specific embodiment of a data network 300 which is suitable for implementing various aspects of the present invention.

FIG. 3 shows a specific embodiment of a data network 300 which is suitable for implementing various aspects of the present invention. As illustrated in FIG. 3, the data network 300 may include a plurality of Internet service providers (ISPs) (e.g., 310a, 310n, 310z) which provide access to the Internet 320. Further, as illustrated in FIG. 3, the data network 300 includes at least one Specialized Foreign Agent 304 and at least one Specialized Home Agent 314. The data network 300 may further include one or more multi-homed hosts (e.g., 303c, 303n) which may utilize the Specialized Foreign Agent (SFA) 304 and/or the Specialized Home Agent (SHA) 314 to communicate with desired correspondent nodes 302.

In the example of FIG. 3, it is assumed that host MHH(C) 303c has a multi-homed presence on addresses $IP_C$ and $IP_{C'}$. According to different embodiments, $IP_C$ and $IP_{C'}$ may be addresses in the same ISP, or in different ISPs. According to a specific implementation, each of the addresses associated with a given multi-homed host (MMH) may be topologically relative to the ISP which assigned its respective address(es) to the MHH in order to maximize the benefit of route/address aggregation. Thus, for example, as illustrated in FIG. 3, address $IP_C$ is topologically correct for ISP-A 301a, and $IP_{C'}$ is topologically correct for ISP-N 310n.

According to a specific embodiment, the multi-homed addresses associated with a given MHH are registered as Care-of-Addresses at the Specialized Foreign Agent 304. When the address assignments for the MHH become known to the Specialized Foreign Agent 304, the Specialized Foreign Agent registers the multiple Care-Of-Address (CoAs) with the Specialized Home Agent 314. Thus, it will be appreciated that, according to at least one embodiment, the Specialized Home Agent may be configured or designed to register and manage multiple Care-Of-Addresses for one or more multi-homed hosts. In the example of FIG. 3, Specialized Home Agent 314 may register and manage Care-of-Addresses $IP_C$, and $IP_{C'}$ which are associated with MHH(C). According to one embodiment, the number of Care-Of-Addresses associated with a given MHH is at least equal to the number of different ISP connections to that MHH. However, it will be appreciated that, in alternate embodiments, any desired number of Care-Of-Addresses may be associated with a given MHH. Further, in alternate embodiments, it is also possible for the Specialized Home Agent to register and mange multiple Care-Of-Addresses for entire networks or subnetworks (which, for example, may be advertised as "Care-Of-Network-Prefixes", although this term does not appear in current MIP literature).

According to one implementation, Host 303c and the Specialized Foreign Agent 304 may be implemented as separate entities. For example, Host 303c and Specialized Foreign Agent 304 may be implemented as separate entities within an enterprise 305, wherein the Specialized Foreign Agent 304 may be configured to function as a gateway router. In such an embodiment, the Care-Of-Addresses $IP_C$ and $IP_{C'}$ will be assigned to the Specialized Foreign Agent 304, and the host 303c may be assigned a local network address within enterprise 305. When inbound traffic having a destination address of $IP_C$ or $IP_{C'}$ is received at the Specialized Foreign Agent 304, the Specialized Foreign Agent may then forward the traffic to Host 303c using the host's local address.

In alternate embodiments, Host 303c and Specialized Foreign Agent 304 may be implemented in an integrated manner such that the functions of the Specialized Foreign Agent 304 are performed by an entity at Host 303c. In such an embodiment, for example, Host 303c may include a plurality of interface cards for connecting to different ISPs in the network. Additionally, in such an embodiment, the addresses $IP_C$ and $IP_{C'}$ may each be assigned to host 303c.

According to a specific embodiment, when the Specialized Foreign Agent 304 registers the Care-Of-Addresses for a given MHH with a Specialized Home Agent, the Specialized Home Agent may monitor the health and/or availability of each of the individual Care-Of-Addresses, and may "de-list" (i.e., un-register) any of the MHH(s) Care-Of-Addresses if it determines that the MHH is no longer accessible via a particular Care-Of-Addresses. Additionally, the Specialized Foreign Agent can register, de-register and/or re-register desired Care-Of-Addresses at will with the Specialized Home Agent, for example, via control protocols and/or via extensions to present Mobile IP registration procedures.

In embodiments where the multi-homed host applications desire high availability, the Specialized Home Agent 314 may be operated in a highly available location inside a particular ISP (e.g., ISP-z) which may or may not be associated with any of the ISPs (e.g., ISP-A, ISP-N, etc.) that provide connectivity to one or more MHHs. For example, a candidate high availability location for the Specialized Home Agent 314 would be near a NAP in a Tier 1 ISP.

In a manner similar to Mobile IP mechanisms, the Specialized Home Agent 314 advertises a local address (e.g., $IP_{MHH(C)}$) which is to be used by correspondent nodes (CNs) 302 for communicating with MHH(C). In one implementation, the address $IP_{MHH(C)}$ represents the "home address" of the multi-homed host MHH(C). Correspondent nodes desiring to contact MHH(C) will use the home address associated with MHH(C), and will thereby interact with MHH(C)'s Specialized Home Agent 314. In alternate embodiments (not shown) an MHH may have multiple Specialized Home Agents, for example, in order to provide redundancy. Thus, for example, in the event that Specialized Home Agent 314 goes down, other Specialized Home Agents associated with MHH(C) may be accessed using conventional networking protocols (such as, for example, A-record information provided in responses to DNS queries).

As explained in greater detail below with respect to FIGS. 4-6, when a correspondent nodes wishes to communicate with MHH(C), the correspondent node sends a packet addresses to IP MHH(C), which is received at Specialized Home Agent 314. The Specialized Home Agent then selects an appropriate tunnel (associated with one of the Care-Of-Addresses for MHH(C)) for forwarding the packet to the Specialized Foreign Agent 304. Upon receiving the tunneled packet, the Specialized Foreign Agent may then forward the packet to MHH(C).

It will be appreciated, in alternate embodiments of the present invention (not shown) the multi-homing technique of the present invention may be used to provide multi-homing capability to entire networks or subnetworks. In such alternate embodiments, an entity representing an entire network and/or subnetwork may be substituted for the multi-homed hosts 303c, 303n of FIG. 3, for example.

Figure 4:
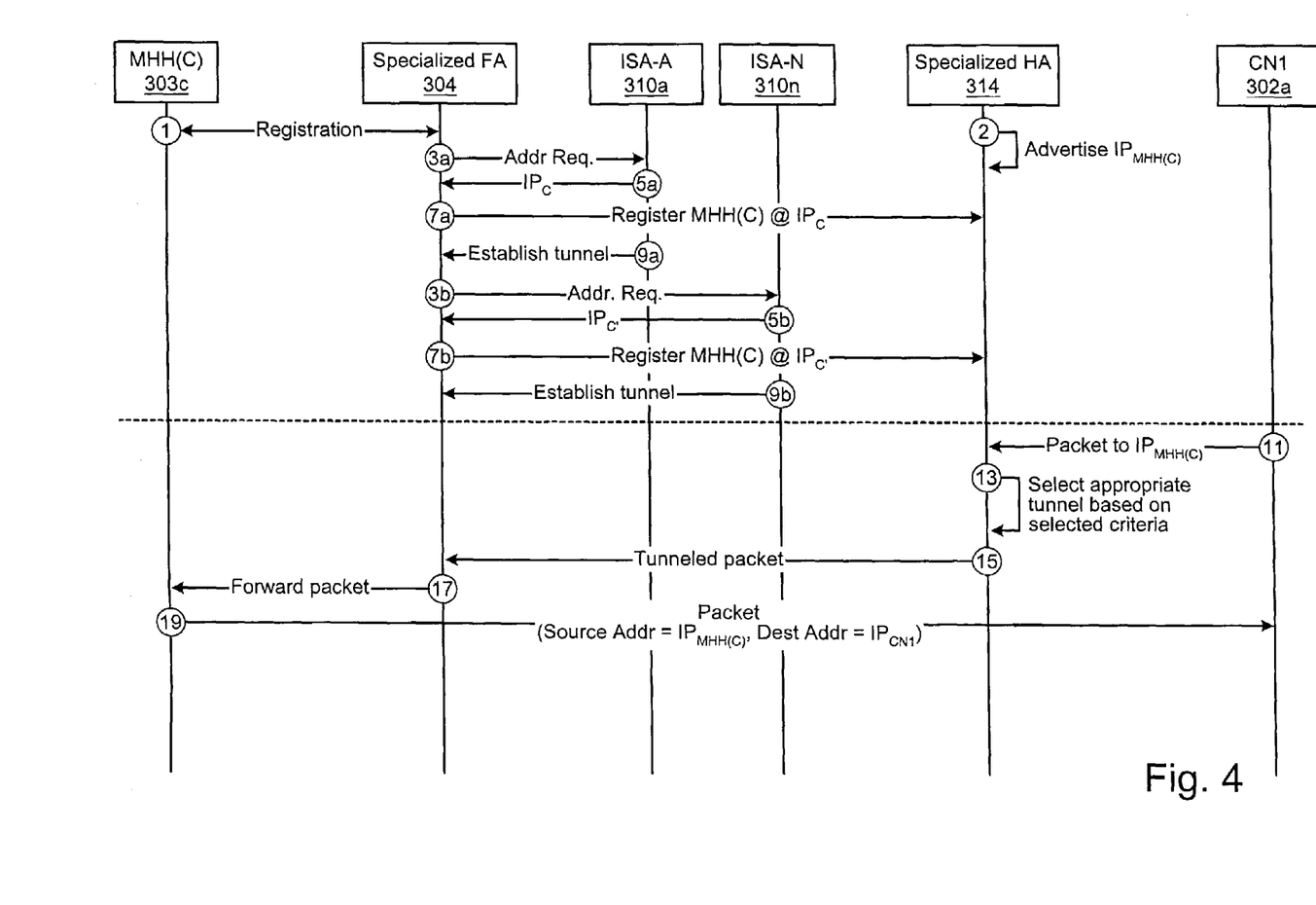
FIG. 4 shows an interaction diagram illustrating how various entities of a data network may communicate with each other in order to implement the multi-homed functionality of the present invention.

FIG. 4 shows an interaction diagram illustrating how various entities of a data network may communicate with each other in order to implement the multi-homed functionality of the present invention. For purposes of illustration, the interaction diagram of FIG. 4 will now be described with respect to network 300 of FIG. 3. Initially, as shown at (1), multi-homed host MHH(C) initiates registration with Specialized Foreign Agent 304. Such registration may occur, for example, at startup of MHH(C), following a system reset at MHH(C), in response to MHH(C) roaming to a different network segment (if mobile), etc. Once registration has been initiated, the Specialized Foreign Agent communicates (3a, 3b) with one or more ISPs (which provide Internet connectivity to MHH(C)) in order to obtain one or more addresses to be used as Care-Of-Addresses for MHH(C). In the example of FIG. 4, it is assumed that 2 ISPs provide Internet connectivity to MHH(C), namely ISP-A and ISP-N. However, it will be appreciated that, in alternate embodiments, any desired number of ISPs may be used to provide Internet connectivity or other desired network connectivity to MHH (C) and/or other MHHs in the network.

For purposes of illustration, it will be assumed in the example of FIG. 4, that Host C 303c and Specialized Foreign Agent 304 are implemented as separate entities within an enterprise 305. Accordingly, in response to receiving the address request, each ISP will allocate (5a, 5b) a respective address to the Specialized Foreign Agent 304 to be used as a Care-Of-Address for MHH(C). According to a specific embodiment, each address allocated by each ISP will be topologically relative to the address space associated with that ISP. Thus, for example, as illustrated in FIG. 4, ISP-A allocates address $IP_C$, and ISP-N allocates address $IP_{C''}$.

After obtaining the requested address information, the Specialized Foreign Agent then registers (7a, 7b) each of the Care-Of-Addresses (associated with MHH(C)) with the Specialized Home Agent 314. One or more tunnels (e.g., IP tunnels) may then be established between the Specialized Home Agent 314 and the Specialized Foreign Agent 304. In one implementation, a separate tunnel may be established for each Care-Of-Address associated with the multi-homed host (e.g., MHH(C)).

Additionally, as illustrated in FIG. 4, the Specialized Home Agent 314 advertises (2) the home address (e.g., $IP_{MHH(C)}$) associated with MHH(C). According to one implementation, the address $IP_{MHH(C)}$ is topologically relative to the ISP associated with special home agent 314 (e.g., ISP-Z). According to different embodiments, the advertisement of the home address for MHH(C) by Specialized Home Agent 314 may occur at various times such as, for example, before, during, and/or after registration of the Care-Of-Addresses for MHH(C).

In one implementation, the above-describe Care-Of-Address registration procedure, tunneling procedure, and/or home address advertising procedure may be implemented in a manner which is similar or identical to the mechanisms implemented by Mobile IP protocols, such as that described, for example, in RFC 3220, herein incorporated by reference in its entirety for all purposes.

FIG. 4 also provides an example of how a communication flow between correspondent node 302a and MHH(C) 303c may be achieved in accordance with a specific embodiment of the present invention. At (11) it is assumed that correspondent node CN1 desires to send a packet to MHH(C). In the embodiment illustrated in FIG. 4, the packet sent by CN1 to MHH(C) will include a destination address corresponding to the home address of MHH(C), which, in the embodiment of FIG. 3, corresponds to $IP_{MHH(C)}$. The packet will be routed to Specialized Home Agent 314. When the packet is received at Specialized Home Agent 314, the Specialized Home Agent identifies the destination address of the received packet, and selects (13) an appropriate tunnel for forwarding the packet to its destination based upon selected criteria. According to a specific embodiment, the Specialized Home Agent may select a particular Care-Of-Address (from the multiple Care-Of-Addresses associated with MHH(C)) for forwarding the received packet to MHH(C) via the Specialized Foreign Agent. The Specialized Home Agent may perform the Care-Of-Address selection based upon a number of criteria such as, for example, explicit signaling of preferred CoAs by the Specialized Foreign Agent, availability of selected CoAs, load associated with selected CoAs, specialized heuristics designed or programmed into the Specialized Home Agent, customer and/or vendor designed criteria, etc. In this way, the technique of the present invention may offer benefits of fine-grained load balancing over multiple CoAs for a given MHH. According to a specific embodiment, the selected criteria which may be used by the Specialized Home Agent in selecting an appropriate tunnel may be stored in a local Tunnel Characteristic Table such as that illustrated, for example, in FIG. 5 of the drawings.

In the example of FIG. 4, the Specialized Home Agent 314 may choose to tunnel (15) the packet to Specialized Foreign Agent 304 via either Care-Of-Address $IP_C$ or Care-Of-Address $IP_{C'}$. When the tunneled packet is received at Specialized Foreign Agent 304, the Specialized Foreign Agent then forwards (17) the packet to its appropriate destination, which, in this example, is MHH(C).

When a multi-homed host such as MHH(C) desires to send a packet to a correspondent node (e.g., CN1), it may do so by sending (19) the packet to the desired correspondent node using conventional routing protocols. According to a specific embodiment, the destination address of the packet will be the address associated with the correspondent node (e.g., $IP_{CN1}$), and the source address of the packet will be the home address associated with the MHH (e.g., $IP_{MHH(C)}$). In specific embodiments where "ingress filtering" security policy in implemented by a particular ISP, and the source address ($IP_{MHH(C)}$) is not identified as an address it provides to it's customers, the packet may be discarded by the ISP at the ingress to it's network. This situation is analogous to present-day MIP operations. Possible solutions to this problem include convincing the ISP not to "ingress filter" these packets, or setting up a "reverse tunnel" back to the Specialized Home Agent. Details describing reverse tunneling techniques are discussed in IETF RFC 3024, entitled, "Reverse Tunneling for Mobile IP, revised," herein incorporated by reference in its entirety for all purposes.

Figure 5:
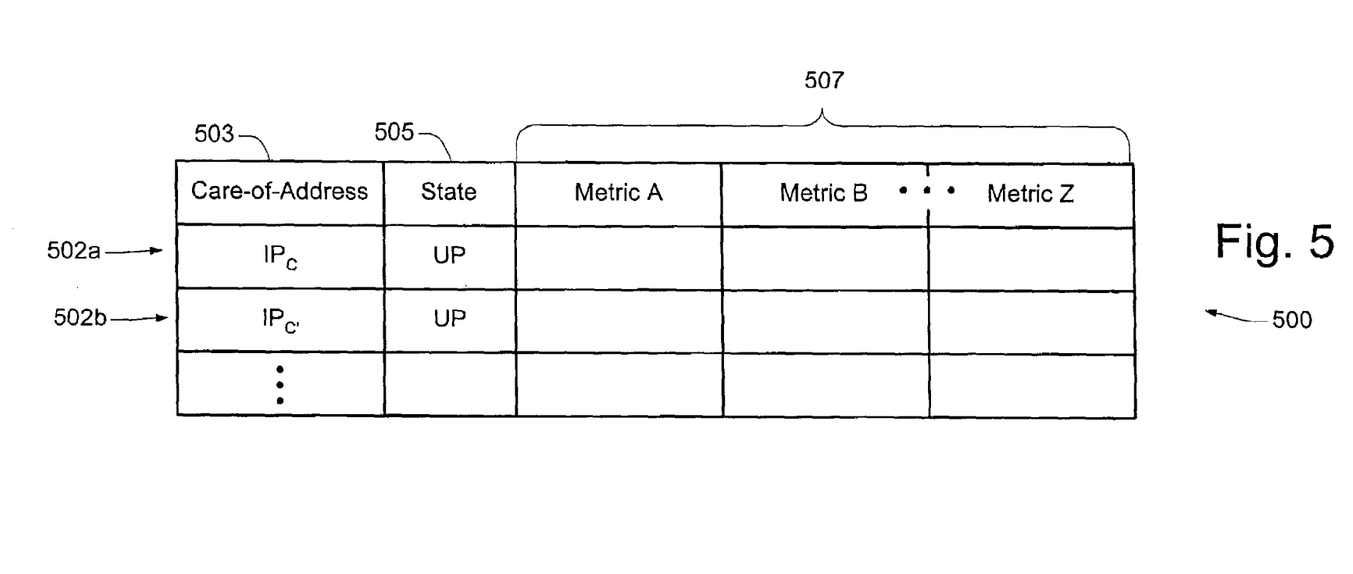
FIG. 5 shows an example of a Tunnel Characteristic Table 500 in accordance with a specific embodiment of the present invention.

FIG. 5 shows an example of a Tunnel Characteristic Table 500 which is associated with a specific multi-homed host such as MHH(C) of FIG. 3. According to a specific embodiment, one or more Tunnel Characteristic Tables may be stored locally at the Specialized Home Agent 314. In one implementation, each Tunnel Characteristic Table may relate to a specific multi-homed host associated with the Specialized Home Agent. As illustrated in FIG. 5, the Tunnel Characteristic Table may include a plurality of entries (e.g., 502a, 502b) relating to specific Care-Of-Addresses associated with a given MHH. Each entry 502 in the Tunnel Characteristic Table may include state information (505), metric information (507), and/or other information relating to the Care-Of-Address (503) associated with that particular entry. Such metric information may include, for example, one way delay time, roundtrip delay time, bit error rate, mean time between failure, last used tunnel or COA for selected source IP address, etc.

The information stored in the tunnel characteristics table (s) may be periodically updated to reflect current network conditions. Examples of updating of the Tunnel Characteristic Table are illustrated in FIGS. 6A and 6B of the drawings. Additionally, at least a portion of the information stored therein may be used by the Specialized Home Agent in determining an appropriate tunnel/Care-Of-Address to be used for traffic flows to a give multi-homed host. This is illustrated, for example, in FIG. 6C of the drawings. According to different embodiments, one or more of the procedures described in FIGS. 6A-6C may be implemented simultaneously at the Specialized Home Agent 314.

Figure 6A:
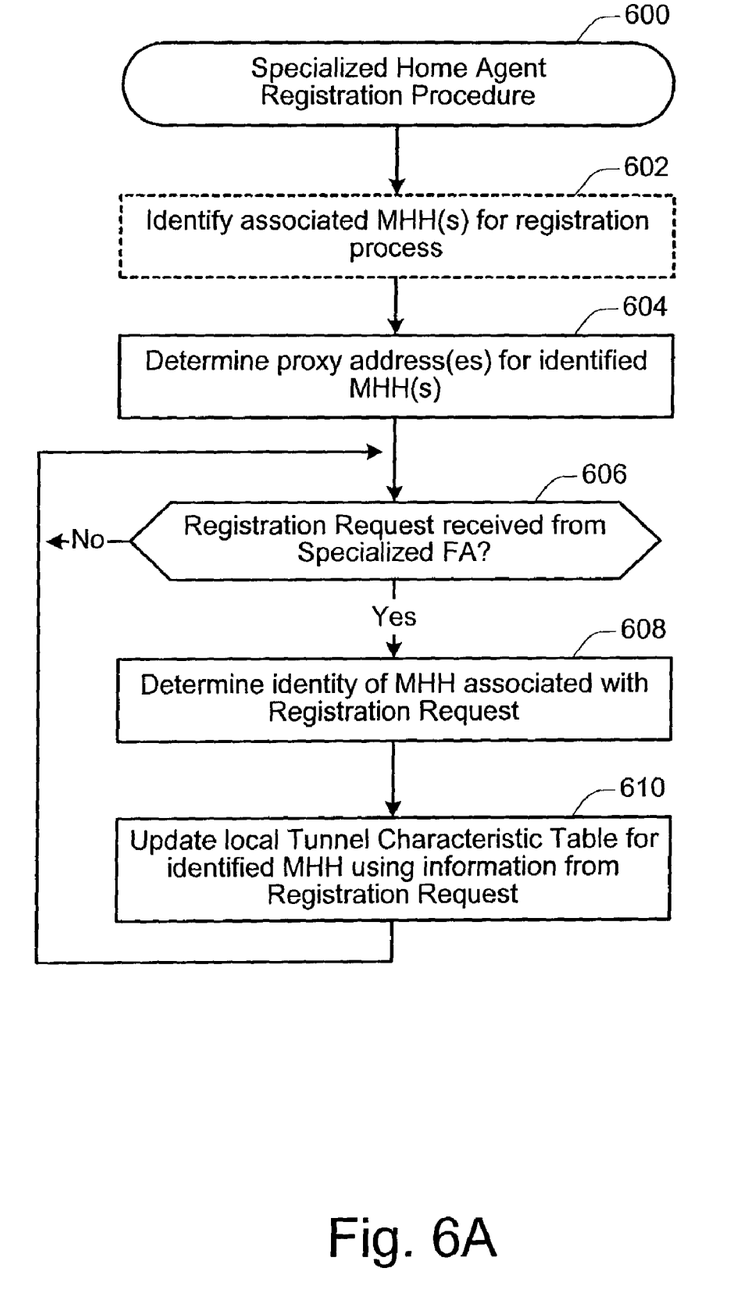
FIG. 6A illustrates a flow diagram of a Specialized Home Agent Registration Procedure 600 in accordance with a specific embodiment of the present invention.
Figure 6B:
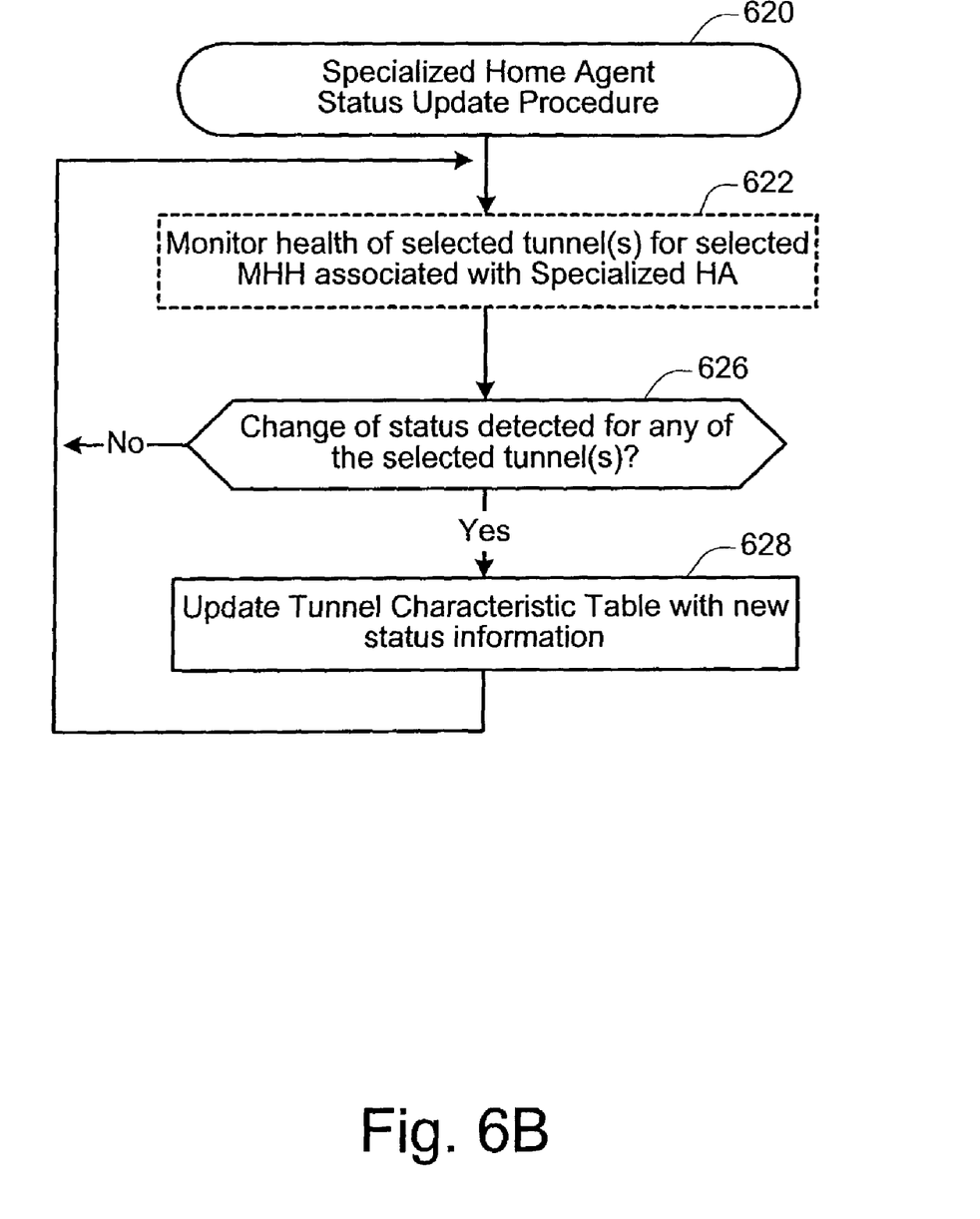
FIG. 6B shows a flow diagram of a Specialized Home Agent Status Update Procedure 620 in accordance with a specific embodiment of the present invention.

FIG. 6A illustrates a flow diagram of a Specialized Home Agent Registration Procedure 600 in accordance with a specific embodiment of the present invention. Initially, as shown at 602, the Specialized Home Agent may identify selected multi-home hosts for which it will serve as the home agent in accordance with the technique of the present invention. In one implementation, selected multi-home hosts may be identified using configuration information pre-provisioned and stored at the Specialized Home Agent. As the services provided by the Specialized Home Agent are in support of customer multi-homing requirements, one can envision other business-driven techniques of identifying such hosts such as, for example, by querying service provider provisioning systems, etc. At least a portion of such host identifying techniques will generally be known to one having ordinary skill in the art.

At 604, the Specialized Home Agent then determines the proxy address (i.e., home address) associated with each of the MHHs identified by the Specialized Home Agent. According to one implementation, at least a portion of the proxy addresses may be statically determined using local configuration information. Alternatively, a portion of the proxy addresses may be dynamically determined, for example, using addresses provided from another network device such as, for example, a DHCP server.

When a registration request is received (606) from a Specialized Foreign Agent, the identity of the MHH associated with the registration request is determined (608). According to one implementation, the registration request may include information associated with new or existing paths (e.g., Care-Of-Addresses) to a particular MHH. Using information from the registration request, the Specialized Home Agent may then update (610) one or more portions of its local Tunnel Characteristic Table(s) relating to the identified MHH.

As described previously, for example, with respect to FIG. 5, the Specialized Home Agent maintains tunnel characteristic information relating to Care-Of-Addresses associated with selected multi-home hosts for which the Specialized Home Agent will represent as home agent. FIG. 6B shows a flow diagram of a Specialized Home Agent Status Update Procedure 620 in accordance with a specific embodiment of the present invention. As illustrated in FIG. 6B, the health of selected tunnels associated with selected tunnels associated with selected Care-Of-Addresses in the Specialized Home Agent(s) Tunnel Characteristic Table(s) may be periodically monitored (622) for current status. In one implementation, the monitoring of the health of the selected tunnels may be accomplished using conventional techniques such as, for example, TCP heartbeat messages. If a change of health or status is detected (626) for any of the selected tunnel(s) the Specialized Home Agent may respond by updating (628) its local Tunnel Characteristic Table(s) with any desired new status information which has been detected. In this way, information stored in the local Tunnel Characteristic Table (s) may be kept up-to-date, thereby facilitating communication between correspondent nodes (CNs) and multi-homed hosts (MHHs).

Figure 6C:
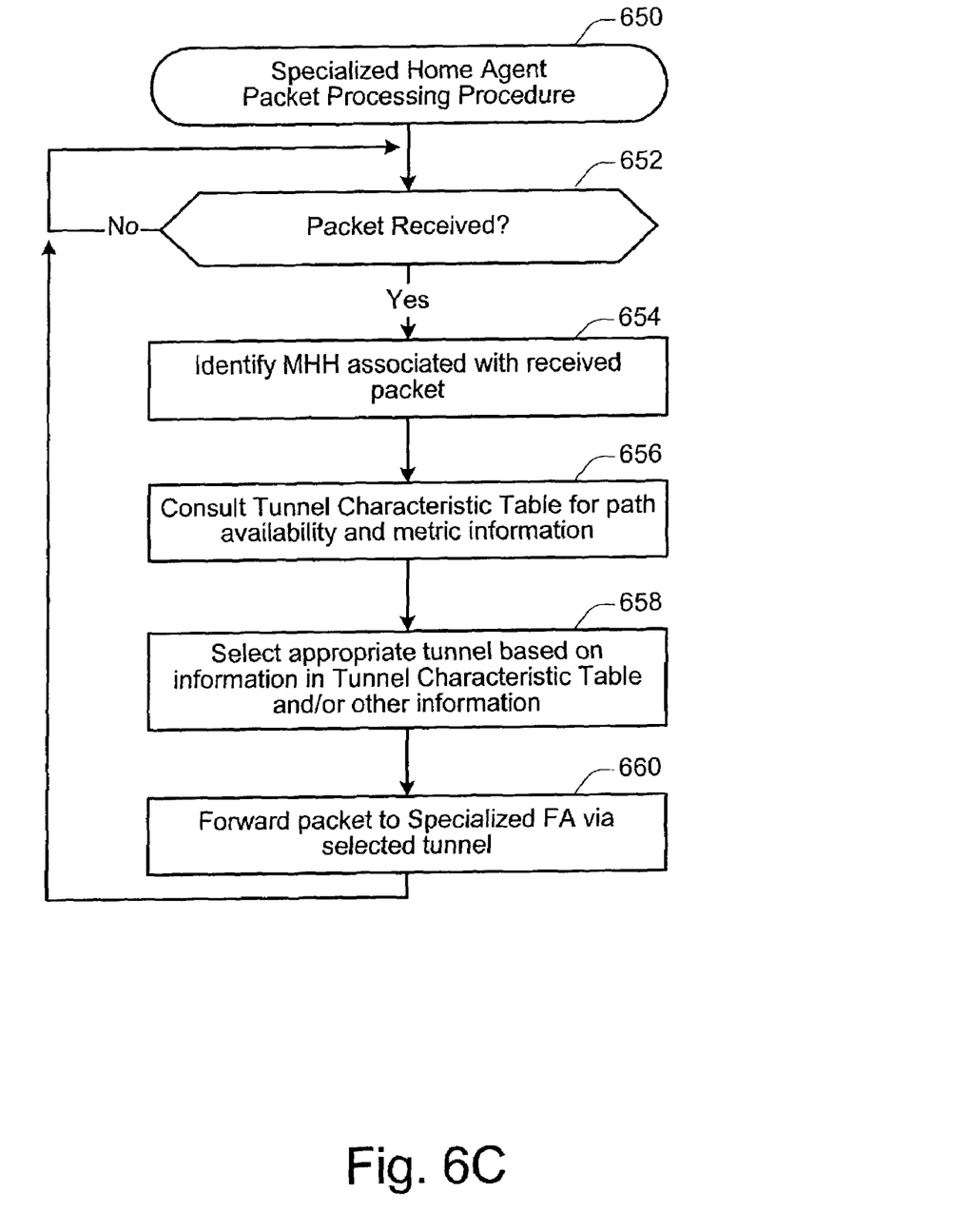
FIG. 6C shows a flow diagram of a Specialized Home Agent Packet Processing Procedure 650 in accordance with a specific embodiment of the present invention.

FIG. 6C shows a flow diagram of a Specialized Home Agent Packet Processing Procedure 650 in accordance with a specific embodiment of the present invention. When a packet destined for a multi-homed host (MHH) is received (652) at the Specialized Home Agent, the multi-homed host associated with the received packet may be identified (654). According to a specific implementation, identification of the MHH may be accomplished by analyzing the destination IP address of the received packet, which will specify the proxy address (or home address) associated with the destination MHH. Information in the Tunnel Characteristic Table(s) may then be consulted (656) in order to obtain, for example, path availability and/or metric information associated with the identified MHH. An appropriate tunnel may then be selected (658) based upon the information obtained from the Tunnel Characteristic Table(s) and/or other information. Once the appropriate tunnel has been selected, the packet is then forwarded (660) to a Specialized Foreign Agent via the selected tunnel.

According to a specific embodiment, policy information stored at the Specialized Home Agent may be used to select an appropriate tunnel for forwarding packets to their appropriate destinations. For example, policy information may direct that packets from privileged clients, identified by source address or address prefix, be preferentially tunneled to the highest performance or most lightly loaded available tunnel path. Load balancing CN traffic across the available tunnels may also be specified via policy. Additionally, during periods of overload or partial network outage, policy may direct privileged clients to operational tunnels and deny service to others. It will be appreciated that one advantage of the technique of the present invention, according to specific embodiments, is that such policy information may be stored only at the Specialized Home Agent, and does not need to be distributed to other routers/agents in the network. This is in contrast to conventional multi-homing techniques such as that described in FIG. 2, where such policy information would need to be distributed to different routers in the network via external routing protocols (resulting in the aforementioned detriments).

In specific embodiments where the multi-homing technique of the present invention is implemented using IPv4 Mobile IP (i.e., without Binding Update (BU) capability) technology, the Specialized Home Agent may be configured or designed to forward and provide switchover and/or reliability functions if one or more CoAs become unavailable or are de-registered. Moreover, it will be appreciated that such switchover and/or reliability functions may be performed more rapidly than traditional multi-homing techniques implemented via conventional routing protocols. One reason for this is because, using traditional multi-homing techniques, route annealing across multiple ISPs via external routing protocols is expected to take longer than the Specialized Home Agent realizing that a particular CoA is down. One disadvantage which may result from using the multi-homing technique of the present invention is that triangular routing mechanisms inherent in MIP IPv4 (w/o BU) may result in the use of additional functionality and bandwidth to and from the Specialized Home Agent. However, this non-optimum routing may be minimized for a large percentage of potential CNs by placing the Specialized HA functionality relatively close, in a topology or propagation sense, to the MHH location (but still in a high available location).

In specific embodiments where the multi-homing technique of the present invention is implemented using IPv6 or IPv4 with Binding Update (BU) capability, the multi-homing technique of the present invention may avoid the triangular routing associated with IPv4, but at a potential expense of switchover delay if a particular CoA goes down after the initial packet forwarding by the Specialized Home Agent and after the Binding Update (BU) has been completed. According to a specific embodiment, if the Specialized Foreign Agent determines that the CoA presently in use is inappropriate, it may send a new BU update to the CN with an appropriate new CoA (e.g., over an operational path out from the MHH). Such functionality is similar to conventional MIP functionality implemented at MIP Foreign Agents.

However, it is noted that conventional MIP technology with BU capability is capable of recognizing only one possible CoA for a given mobile node at a given time. If the CoA changes, a correspondent node (CN) will typically rely on the (MIP) "mobile node" to inform it of the CoA change. Therefore, it is anticipated that most MIP stacks in the CN would not re-query the Home Agent to obtain a new CoA. As an optimization for a specific embodiment of the present invention, it may be attractive for the CN to re-query the Home Agent to obtain, for example, a different but valid CoA whenever the CN believes a problem in connectivity exists. In such an embodiment IP stacks in the CNs may be modified to include such "re-query for another CoA" functionality in order to take advantage of this fast-failover capability of the present invention.

For applications where both the CN and the MHH are using the transport protocol SCTP (Stream Control Transport Protocol, which is described in IETF RFC 2960, herein incorporated by reference in its entirety for all purposes), an even simpler process may be used by the Specialized Foreign Agent for both the IPv4 and IPv6 cases (with or without MIP BU capability). For example, after contact by the CN, the Specialized Foreign Agent 304 (which may be implemented at the MHH 303c) may add all of its Care-Of-Addresses (associated with a given MHH) to the existing SCTP association. Afterwards, the Specialized Foreign Agent may preferentially use selected addresses for outbound traffic and, via SCTP's "Set Primary" command, recommend a desired incoming address to the CN. Such a technique provides the added benefit of continued application layer connectivity to the Specialized Foreign Agent and/or MHH, even at times when a currently used Care-Of-Address goes down. Additionally, by invoking SCTP's add and delete IP address functionality, the Specialized Foreign Agent may also proactively add and/or delete IP addresses at will.

It will be appreciated that, according to different embodiments, the multi-homing technique of the present invention may be used to provide high-availability to hosts, networks, and/or subnetworks while avoiding the problems associated with conventional multi-homing techniques such as, for example, increased burdens on IP routing advertisement mechanisms, increased bandwidth and routing table burdens, etc. Additionally, the technique of the present invention may provide faster failover and/or switchover capability than multi-homing techniques implemented via routing advertisements. Moreover, it is noted that, according to specific embodiments, the multi-homing technique of the present invention may be implemented in existing networks without implementing changes in the in present functionality the CNs.

Another benefit of the multi-homing technique of the present invention is that the Specialized Home Agent may provide load balancing and overload-control of the traffic toward a given MHH over it's active (i.e., presently registered) CoAs. For example, the Specialized Home Agent heuristics may select, based upon selected metrics (e.g., load, priority of the CN, etc.) preferred CoAs for which it will direct specific traffic. As described previously, such a benefit would be difficult to achieve using conventional multi-homing techniques without significantly increasing the burden on external routing protocols and advertisement bandwidth.

It will be appreciated that specific implementations of the present invention may utilize a Specialized Home Agent in a manner which results in the Specialized Home Agent being a single point of failure. As described in greater detail below, several methods may be used to overcome and/or mitigate this undesirable feature. One approach is to place the Specialized Home Agent in high-availability hardware and in a highly available location in a Tier 1 ISP. For example, In one embodiment, the Specialized Home Agent may be placed near a major point of interconnect between major Tier 1 ISPs (i.e., near a NAP). Another approach is to provide multiple Specialized Home Agents. For example, in such an embodiment, one could refer to a selected Specialized Home Agent by means of a URL, and have DNS technologies resolve to one of the multiple Specialized HA addresses. DNS could also be configured to provide a failover mechanism to contact one of the redundant the Specialized Home Agents in case of a detected failure at another Specialized Home Agent.

OTHER EMBODIMENTS

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the Home Agents of this invention may be implemented in specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 7:
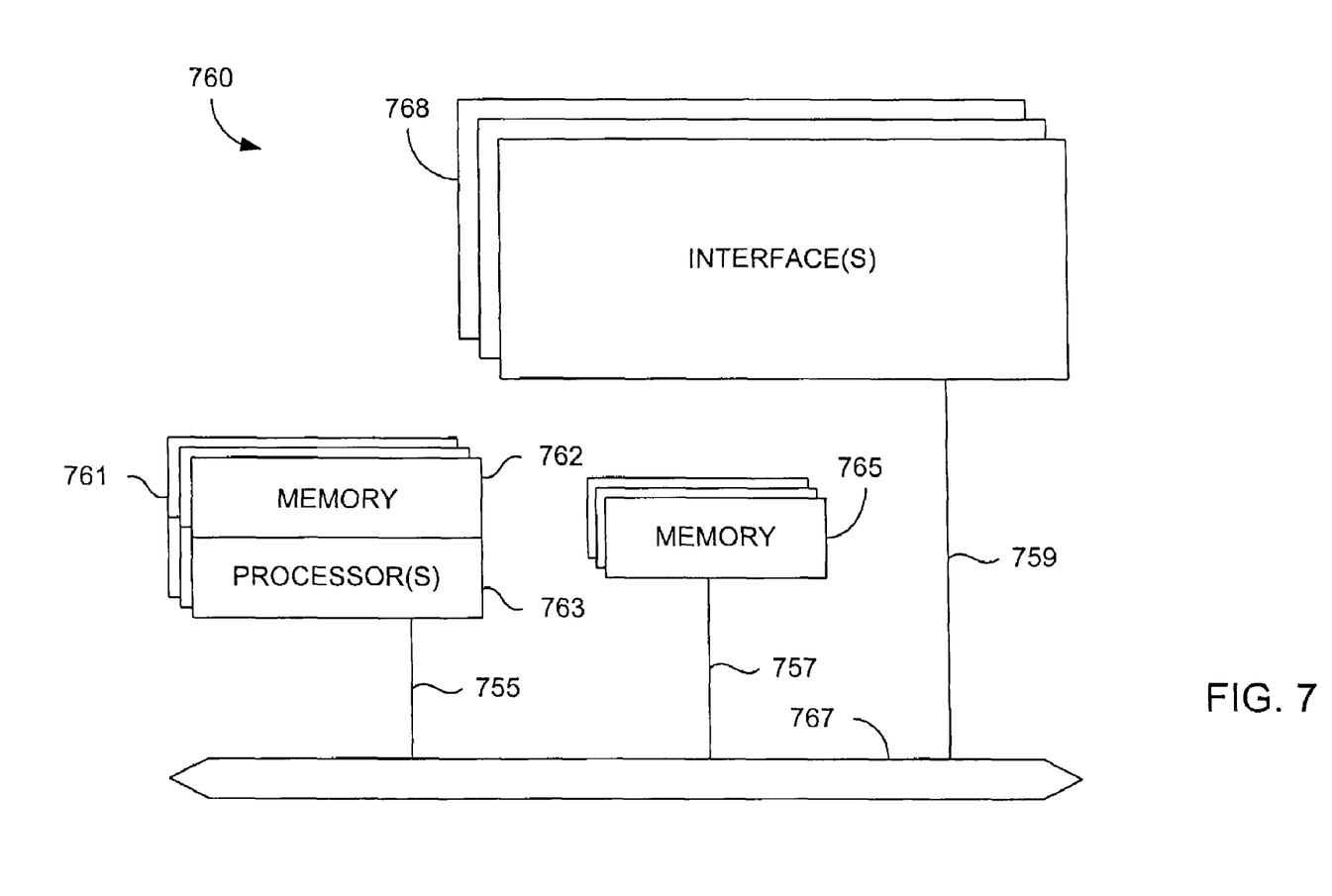
FIG. 7 shows a block diagram of a network device 760 suitable for implementing various aspects of the present invention.

Referring now to FIG. 7, a network device 760 suitable for implementing the techniques of the present invention includes a master central processing unit (CPU) 762, interfaces 768, and a bus 767 (e.g., a PCI bus). When acting under the control of appropriate software or firmware, the CPU 762 may be responsible for implementing specific functions associated with the functions of a desired network device. For example, when configured as an intermediate router, the CPU 762 may be responsible for analyzing packets, encapsulating packets, and forwarding packets for transmission to a set-top box. The CPU 762 preferably accomplishes all these functions under the control of software including an operating system (e.g. Windows NT), and any appropriate applications software.

CPU 762 may include one or more processors 763 such as a processor from the Motorola family of microprocessors or the MIPS family of microprocessors. In an alternative embodiment, processor 763 is specially designed hardware for controlling the operations of network device 760. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

The interfaces 768 are typically provided as interface cards (sometimes referred to as "line cards"). Generally, they control the sending and receiving of data packets over the network and sometimes support other peripherals used with the network device 760. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 765) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being implemented to enable a mobile node to be dynamically assigned a Home Agent, as well as enable a shared key to be provided to the mobile node and/or the appropriate Mobility Agents (e.g., Home Agents). However, it should be understood that the invention is not limited to such implementations, but instead would equally apply regardless of the context and system in which it is implemented. Thus, broadly speaking, the operations described above may be used to enable dynamic assignment with respect to other mobility agents, such as Foreign Agents. In addition, the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. A method for implementing multi-homing capability in a data network, the data network including a wide area network and a plurality of network service providers, the data network further including at least one host, the at least one host including a first host, the first host having associated therewith a first home agent, the method comprising:
    obtaining a plurality of network addresses associated with the first host;
    each of the plurality of network addresses representing a respective Care-of-Address associated with the first host, wherein each of the plurality of network addresses is topologically correct relative to one of the plurality of network service providers; and
    registering two or more of the network addresses with the first home agent, thereby enabling packets to be forwarded to the first host via the two or more of the network addresses, wherein registering is performed via a single Foreign Agent.

2. The method of claim 1 further comprising:
    obtaining a first network address of the plurality of network addresses from a first network service provider of the plurality of network service providers, the first network address being topologically correct relative to the first network service provider; and
    obtaining a second network address of the plurality of network addresses from a second network service provider of the plurality of network service providers, the second network address being topologically correct relative to the second network service provider.

3. The method of claim 1 further comprising providing multi-homing capability to the first host via at least a portion of the plurality of network addresses;
    wherein implementation of the multi-ho g capability is achieved without using a host route injection technique.

4. The method of claim 1 further comprising providing multi-homing capability to the first host via at least a portion of the plurality of network addresses;
    wherein implementation of the multi-homing capability is achieved using Mobile IP based protocols.

5. The method of claim 1 further comprising providing multi-homing capability to the first host via at least a portion of the plurality of network addresses;
    wherein implementation of the multi-homing capability is achieved without causing the plurality of network service providers to advertise foreign network addresses associated with the first host.

6. The method of claim 1 further comprising providing multi-homing capability to the first host via at least a portion of the plurality of network addresses;
    wherein implementation of the multi-homing capability is achieved without causing the plurality of network service providers to advertise foreign network prefixes associated with the first host.

7. The method of claim 1 further comprising providing multi-homing capability to the first host via at least a portion of the plurality of network addresses;
    wherein implementation of the multi-homing capability is achieved without substantially increasing a route annealing time associated with routing convergence of external routing protocols.

8. The method of claim 1 further comprising:
    establishing a first transport session between the first host and a correspondent node using a first Care-Of-Address of the plurality of Care-Of-Addresses associated with the first host; and
    continuing the first transport session between the first host and the correspondent node using a second Care-Of-Address of the plurality of Care-Of-Addresses.

9. The method of claim 8 further comprising providing multi-homing capability to the first host via at least a portion of the plurality of network addresses;
    wherein implementation of the multi-homing capability is achieved without using a host route injection technique; and
    wherein implementation of the multi-homing capability is further achieved without using a Stream Control Transmission Protocol.

10. A computer program product, the computer program product including a computer usable storage medium having computer readable code embodied therein, the computer readable code comprising computer code for implementing the method of claim 1.

11. The method as recited in claim 1, further comprising:
    generating, at the first host, at least one data parcel to be sent to a correspondent node in the data network, wherein a care-of address of the data parcel is one of the plurality of network addresses.

12. A system for implementing multi-homing capability in a data network, the data network including a wide area network and a plurality of network service provider the data network further including at least one host, including a first host, the first host having associated therewith a first home agent, the system comprising:
- at least one processor;
- at least one interface configured or designed to provide a communication link to at least one other network device in the data network; and
- memory,
- the system being configured or designed to obtain a plurality of network addresses associated with the first host, wherein each of the plurality of network addresses is topologically correct with respect to one of the plurality of network service providers;
- each of the plurality of network addresses representing a respective Care-of-Address associated with the first host; and
- the system being further configured or designed to register two or more of the network addresses with the first home agent, thereby enabling data packets to be forwarded to the first host via the registered two or more of the network addresses, wherein registering is performed via a single Foreign Agent.

13. The system of claim 12 being further configured or designed to:
- obtain a first network address of the plurality of network addresses from a first network service provider of the plurality of network service providers, the first network address being topologically relative to the first network service provider, and
- obtain a second network address of the plurality of network addresses from a second network service provider of the plurality of network service providers, the second network address being topologically relative to the second network service provider.

14. The system of claim 12 being further configured or designed to provide multi-homing capability to the first host via at least a portion of the plurality of network addresses;
- wherein implementation of the multi-homing capability is achieved without using a host route injection technique.

15. The system of claim 12 being further configured or designed to provide multi-homing capability to the first host via at least a portion of the plurality of network addresses;
- wherein implementation of the multi-homing capability is achieved using Mobile IP based protocols.

16. The system of claim 12 being further configured or designed to provide multi-homing capability to the first host via at least a portion of the plurality of network addresses;
- wherein implementation of the multi-homing capability is achieved without causing the plurality of network service providers to advertise foreign network addresses associated with the first host.

17. The system of claim 12 being further configured or designed to provide multi-homing capability to the first host via at least a portion of the plurality of network addresses;
- wherein implementation of the multi-homing capability is achieved without substantially increasing a route annealing time associated with routing convergence of external routing protocols.

18. The system of claim 12 being further configure or designed to:
- the system being further configured or designed to establish a first transport session between the first host and a correspondent node using a first Care-Of-Address of the plurality of Care-Of-Addresses associated with the first host; and
- the system being further configured or designed to continue the first transport session between the first host and the correspondent node using a second Care-Of-Address of the plurality of Care-Of-Addresses.

19. The system of claim 18 being further configured or designed to provide multi-homing capability to the first host via at least a portion of the plurality of network addresses;
- wherein implementation of the multi-homing capability is achieved without using a host route injection technique; and
- wherein implementation of the multi-homing capability is further achieved without using a Stream Control Transmission Protocol.

20. A system for implementing multi-homing capability in a data network, the data network including a wide area network and a plurality of network service providers, the data network further including at least one host, including a first host, the first host having associated therewith a first home agent, the system comprising:
- means for obtaining a plurality of network addresses associated with the first host;
- each of the plurality of network addresses representing a respective Care-of-Address associated with the first host, wherein each of the plurality of network service providers has associated therewith one or more of the plurality of network addresses such that each of the plurality of network addresses is topologically correct with respect to one of the plurality of network service providers; and
- means for registering the plurality of network addresses with the first home agent, thereby enabling packets to be forwarded to the first host via the plurality of network service providers using the plurality of network addresses, wherein registering is performed via a single Foreign Agent.

21. The system of claim 20 further comprising:
- means for obtaining a first network address of the plurality of network addresses from a first network service provider of the plurality of network service providers, the first network address being topologically correct relative to the first network service provider; and
- means for obtaining a second network address of the plurality of network addresses from a second network service provider of the plurality of network service providers, the second network address being topologically correct relative to the second network service provider.

22. The system of claim 20 further comprising means for providing multi-homing capability to the first host via at least a portion of the plurality of network addresses;
- wherein implementation of the multi-homing capability is achieved without using a host route injection technique.

23. The method as recited in claim 1, wherein each of the plurality of network service providers has associated therewith at least one of the plurality of network addresses for which the corresponding network dress is topologically correct.

24. The method as recited in claim 1, wherein each of the plurality of network service providers has associated therewith at least one of the plurality of network addresses for which the corresponding network address is topologically correct.

25. The system as recited in claim 12, wherein each of the plurality of network service providers has associated therewith at least one of the plurality of network addresses for which the corresponding network address is topologically correct.

* * * * *